Patented Sept. 15, 1931

1,823,265

UNITED STATES PATENT OFFICE

THOMAS W. W. FORREST, OF FRESNO, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA

METHOD FOR TREATING DRIED FRUIT PARTICULARLY RAISINS

No Drawing. Application filed October 6, 1925. Serial No. 60,909.

This invention relates to the processing of dried fruits to prepare them for packing and the market, and has for its object improvements in such methods whereby the quality of the final product is improved over that of the earlier methods.

The improvements herein described have a bearing on the general method of treating dried raisins in which the raisins are first processed by heat and vapor to prepare them for seeding, the fruit is seeded, and then conditioned by controlled cooling preparatory to packing in cartons and boxes.

By the general treatment above outlined and through numerous variations of the same the raisins are rendered unctuous, homogeneous, and being sterilized through the heat treatment they are of good keeping qualities.

In the treatment of raisins as mentioned, the fruit is passed through heated metal drums and over hot metal plates or conveyors—and it has been proposed by others to spray a mineral oil against the metal surfaces or against the fruit for the purpose of both lubricating the sliding surfaces of metal against the fruit as well as for the purpose of slightly coating the fruit berries whereby they become nonadhesive.

However, there are several objections to the treatment with a mineral oil and in working to overcome these I have discovered a means for accomplishing the result desired while at the same time greatly improving the flavor of the fruit over any similar product hertofore produced.

Referring back to the general method of treating raisins as outlined it will be noted that one step consisted in removal of the seeds of the fruit—and I have found that in removing the seeds one of the most important sources of flavor is also removed, for the reason that in the seeds of most fruit is contained a natural oil of the fruit which appears to be the very source of flavor—being similar in this respect to the oil expressed from nuts in holding virtually all of the flavor and aroma of the nut.

Having made this discovery I applied it to the improvement of dried and processed fruits, from which the seeds or pits have been removed, such for instance, as seeded muscat raisins, and with very satisfactory results.

To carry out the invention in the case of raisins, I take the seeds which have been removed by the well known means and express the oil therefrom. This oil is properly clarified by settling, decantation, and filtration, one or all and preferably pasteurized or similarly treated to prevent it becoming rancid if not used immediately.

The substantially pure natural oil of the fruit is then applied to the fruit at any desirable stage of its processing either by spraying against the fruit, handling apparatus or otherwise as may be desired, so that the final fruit product contains or is coated with substantially the very oil which was removed from it with the seeds.

This results in giving the fruit the desired physical characteristics mentioned and at the same time imparts an extraordinarily fine nutty flavor, due probably to the minute film of the highly flavored natural oil of the fruit itself being principally on the surface of the fruit where its flavor is more quickly imparted to the organs of taste than would be the case where it is entrapped within or adjacent the seeds of the fruit as normally in unseeded fruit.

It is manifest that my method may be practised with dried fruits of any kind, tho it is especially valuable in the treatment of raisins of the muscat variety as these are usually seeded for the market.

In considering my invention it should be noted that it adds no foreign material of any kind to the fruit but simply restores the natural oil in a practicable manner, thus as it were resulting in a process of treating dried fruit in which only the inert matter of the seeds is removed from the final product, tho it will also be apparent that the flavor can be intensified by the use of a greater quantity of oil, or by blending with oils from similar and other fruit.

I claim:

1. The method of processing dried raisins which includes seeding the same, expressing the oil from the seeds, clarifying the oil and reapplying it with agitation to the raisins.

2. The method of processing dried raisins which includes seeding the same, expressing the oil from the seeds, and reapplying the oil to the raisins while maintaining them in a heated condition.

3. A new article of manufacture comprising dried raisins with their exteriors coated with oil of the seeds of raisins.

4. The process of treating seeded raisins comprising applying a film of raisin seed oil to the surface of the same.

5. As a new article of manufacture, a seeded raisin having a surface film of raisin seed oil.

THOMAS W. W. FORREST.